US010775909B2

(12) United States Patent
Lu et al.

(10) Patent No.: US 10,775,909 B2
(45) Date of Patent: Sep. 15, 2020

(54) CURSOR CONTROL SYSTEM AND CONTROL METHOD THEREOF

(71) Applicants: DEXIN ELECTRONIC LTD., Dongguan, Guangdong (CN); DEXIN CORPORATION, New Taipei (TW)

(72) Inventors: Ho-Lung Lu, New Taipei (TW); Yuan-Jung Chang, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 2 days.

(21) Appl. No.: 16/252,416

(22) Filed: Jan. 18, 2019

(65) Prior Publication Data
US 2019/0294262 A1    Sep. 26, 2019

Related U.S. Application Data

(60) Provisional application No. 62/646,484, filed on Mar. 22, 2018.

(51) Int. Cl.
*G06F 3/0354*    (2013.01)
*G06F 3/14*    (2006.01)
*G06F 3/038*    (2013.01)
*H04L 29/08*    (2006.01)

(52) U.S. Cl.
CPC .......... *G06F 3/038* (2013.01); *G06F 3/03543* (2013.01); *G06F 3/1423* (2013.01); *G06F 2203/0384* (2013.01); *H04L 67/10* (2013.01)

(58) Field of Classification Search
CPC .... G06F 3/038; G06F 3/03543; G06F 3/1423; G06F 2203/0384; H04L 67/10
See application file for complete search history.

(56) References Cited

U.S. PATENT DOCUMENTS

| | | | | |
|---|---|---|---|---|
| 5,748,189 A | * | 5/1998 | Trueblood | G06F 3/038 |
| | | | | 715/755 |
| 7,124,374 B1 | * | 10/2006 | Haken | G06F 3/038 |
| | | | | 715/859 |
| 7,385,584 B2 | * | 6/2008 | Segre | G06F 3/023 |
| | | | | 345/156 |
| 8,473,654 B2 | * | 6/2013 | Dickens | G06F 3/1446 |
| | | | | 710/73 |

(Continued)

*Primary Examiner* — Ricardo Osorio
(74) *Attorney, Agent, or Firm* — Li & Cai Intellectual Property (USA) Office

(57) ABSTRACT

A cursor control system including a plurality of electronic devices is provided. Each of the electronic devices includes a display screen to display a data frame and a cursor. The cursor control system includes a first electronic device, a second electronic device, a mouse and a displacement detection unit. The mouse controls a movement and a direction of the cursor on the first electronic device or the second electronic device. The data frame is dragged to another position or into another data frame on the display screen when the data frame is clicked by the mouse. The displacement detection unit detects whether the cursor moves to a boundary of the first electronic device or a boundary of the second electronic device. The displacement detection unit detects whether the data frame moves to the boundary of the first electronic device or the boundary of the second electronic device.

8 Claims, 6 Drawing Sheets

(56) References Cited

U.S. PATENT DOCUMENTS

| | | | | |
|---|---|---|---|---|
| 8,508,470 | B2* | 8/2013 | Moscovitch | G06F 3/0219 345/156 |
| 9,013,366 | B2* | 4/2015 | Zheng | G09G 3/20 345/1.1 |
| 9,588,604 | B2* | 3/2017 | Zheng | G06F 3/038 |
| 10,437,413 | B2* | 10/2019 | Murakami | G06F 3/0416 |
| 2004/0263424 | A1* | 12/2004 | Okuley | G06F 3/1446 345/1.1 |
| 2006/0038741 | A1* | 2/2006 | Mori | G06F 3/0481 345/1.1 |
| 2006/0143571 | A1* | 6/2006 | Chan | G06F 3/03543 715/764 |
| 2009/0259963 | A1* | 10/2009 | Vyas | G06F 3/0481 715/783 |
| 2012/0287042 | A1* | 11/2012 | Chen | G06F 3/023 345/157 |
| 2013/0244784 | A1* | 9/2013 | Assa | A63F 13/12 463/40 |

* cited by examiner

CURSOR CONTROL SYSTEM AND CONTROL METHOD THEREOF

CROSS-REFERENCE TO RELATED PATENT APPLICATION

This application claims the benefit of priority to prior application U.S. Ser. 62/646,484, filed on Mar. 22, 2018. The entire content of the above identified application is incorporated herein by reference.

FIELD OF THE DISCLOSURE

The present disclosure relates to a control system, and more particularly to a cursor control system and control method thereof.

BACKGROUND OF THE DISCLOSURE

With the advancement of technology, flash drives that are lightweight and convenient are widely used to avoid troubles relating to low storage capacity and portability. However, excessive use of the flash drive may cause damage to the data, and a continuous insertion and removal of the flash drive may cause damage to the plug. Therefore, how a system that can easily transfer data can be designed is an important issue in the related art.

SUMMARY OF THE DISCLOSURE

An exemplary embodiment of the present disclosure provides a cursor control system including a first electronic device, a second electronic device, a mouse and a displacement detection unit. The mouse outputs a cursor to be displayed on the first electronic device or the second electronic device. The displacement detection unit respectively configures a corresponding detection program in the first electronic device or the second electronic device, the detection program is used for detecting a movement of the cursor on a display screen of the first electronic device or on a display screen of the second electronic device. When the mouse outputs the cursor on the first electronic device and the detection program of the first electronic device detects that the cursor moves into a predetermined boundary of the display screen on the first electronic device, the detection program of the first electronic device instructs the cursor outputted by the mouse to switch from the first electronic device to the second electronic device.

An exemplary embodiment of the present disclosure provides a cursor control method applied to a cursor control system including a first electronic device, a second electronic device and a mouse, the first electronic device and the second electronic device respectively have a display screen displaying a data frame and a cursor. The method includes: when the mouse outputs the cursor on the first electronic device and a detection program of the first electronic device detects the cursor to move into a predetermined boundary of the display screen on the first electronic device, the detection program of the first electronic device instructs the cursor outputted by the mouse to switch from the first electronic device to the second electronic device; the mouse stops outputting the cursor to the first electronic device; and the mouse outputs the cursor to the second electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
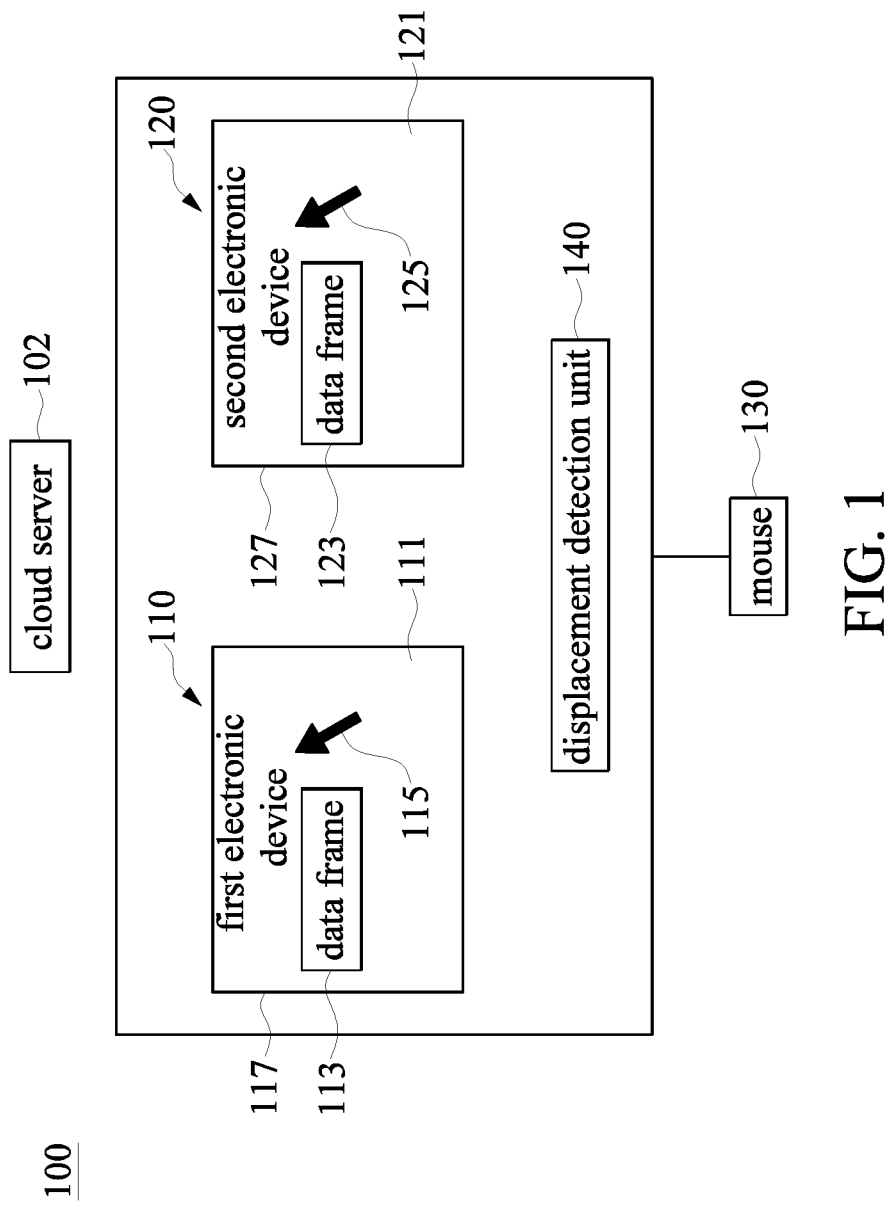
FIG. 1 is a block diagram showing a cursor control system depicted in accordance with an exemplary embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1. FIG. 1 is a block diagram showing a cursor control system depicted in accordance with an exemplary embodiment of the present disclosure. The cursor system 100 includes a plurality of electronic devices.

The cursor system 100 may include a first electronic device 110, a second electronic device 120, a mouse 130 and a displacement detection unit 140. The number of the first electronic device 110 and the second electronic device 120 are not limited herein and can be expanded flexibly for use according to demand. More specifically, the first electronic device 110 includes a display screen 111, a data frame 113, a cursor 115 and a boundary 117. The second electronic device 120 includes a display screen 121, a data frame 123, a cursor 125 and a boundary 127. The first electronic device 110 and the second electronic device 120 may be, for example, a notebook, a tablet, a desktop computer, or an integrated full function (All-in-One) computer, etc., and will not be limited herein. The data frames 113, 123 are, for example, a data folder illustrated on a work desktop after an operating system boots in a computer apparatus. The data folder can be stored by various file specifications of electronic file data. The mouse 130 of the exemplary embodiment outputs the cursor 115 to be displayed on a first display device or outputs the cursor 125 to be displayed on a second display device, that is, only one electronic device can receive the cursor at a time, and the mouse 130 can allow a user to intuitively manipulate the cursor to slide from a display screen of an electronic device to a display screen of another electronic device.

In an exemplary embodiment, the displacement detection unit 140 is used for determining a movement of a cursor on the display screen of every electronic device. For example, when a cursor moves into a predetermined boundary of a display screen in an electronic device, the displacement detection unit 140 may instruct the mouse 130 to output the cursor to switch from the current electronic device to another electronic device. In an exemplary embodiment, the displacement detection unit 140 respectively configures a corresponding detection program in the first electronic device 110 and the second electronic device 120. After each of the electronic devices boots, communication settings between the detection programs can be initialized, so that the detection programs mutually detect how a switch order of the cursor is switched between the electronic devices. For example, under the circumstance that the display screen 111 of the first electronic device 110 has four boundaries 117, the first electronic device 110 can set that when the cursor 115 moves into any one of the boundaries 117, the cursor 115 would be switched from the current electronic device to a corresponding electronic device.

In addition, aside from the above-mentioned description that the cursor can move from a display screen of an electronic device to a display screen of another electronic device, in an exemplary embodiment, the displacement detection unit 140 can further detect whether a data frame is dragged by the cursor on the display screen when the cursor moves. For example, when the detection program of the first electronic device 110 detects that the cursor 115 moves into a predetermined boundary of the display screen 111 in the first electronic device 110 while dragging a data frame 113 in the display screen 111 of the first electronic device 110, the detection program of the first electronic device 110 outputs a data of the data frame in the first electronic device 110 to a cloud server 102 in a wireless network, and the cloud server 102 outputs the data to the second electronic device 120. Furthermore, it should be noted that the detection program of the first electronic device 110 outputs a first group of identification codes and a second group of identification codes to the cloud server 102, so that the cloud server 102 receives the data of the data frame from the first electronic device 110 according to the first group of identification codes and outputs the data of the data frame to the second electronic device 120 according to the second group of identification codes.

In an exemplary embodiment, the first group of identification codes includes a series code of the mouse 130 and a series code of the first electronic device 110. The second group of identification code includes the series code of the mouse 130 and a series code of the second electronic device 120. The series codes of the above may be a product code of a device or an identification code for identification, differentiation and use, and the first group of identification codes and the second group of identification codes are different from each other and unique, to allow the cloud server to identify each of the electronic devices and transmit data between the electronic devices. Therefore, when the first electronic device 110, the second electronic device 120 and the mouse 130 respectively have a series code, the mouse 130 can connect to the first electronic device 110 or the second electronic device 120 through a wired transmission line. In addition, the mouse 130 can also connect to the first electronic device 110 or the second electronic device 120 through a wireless Bluetooth or a wireless radio frequency. The displacement detection unit 140 can perform the following operations according to a connection status between the mouse 130 and the electronic device.

The mouse 130 can control a movement distance and a movement direction of the cursor 115 in the first electronic device 110, and also control a movement distance and a movement direction of the cursor 125 in the second electronic device 120. When the mouse 130 properly controls the cursor to move into the predetermined boundary of the display screen, the cursor outputted by the mouse is switched from the display screen 111 of the first electronic device 110 to the display screen 121 of the second electronic device 120, or from the display screen 121 of the second electronic device 120 to the display screen 111 of the first electronic device 110. Furthermore, when the cursor of the mouse 130 clicks and drags the data frame illustrated in the first electronic device 110, not only can the data frame 113 be dragged to any position on the current display screen 111, the data frame 123 can also be dragged to a predetermined boundary of the display screen 121, such that the data frame 113 of the first electronic device 110 can be copied or moved to the second electronic device 120. Similarly, when the cursor of the mouse 130 clicks and drags the data frame 123 illustrated in the second electronic device 120, the above-mentioned operations can be performed to drag the data frame 123 illustrated in the second electronic device 120 to the display screen 111 of the first electronic device 110, such that the data frame 123 of the second electronic device can be copied or moved to the first electronic device 110.

More specifically, in order to achieve the above-mentioned operations, the displacement detection unit 140 is used for detecting whether the cursor 115 moves into the boundary 117 of the display screen 111 in the first electronic device 110. The displacement detection unit 140 is also used for detecting whether the cursor 115 moves into the boundary 127 of the display screen 121 in the second electronic device 120. Furthermore, the displacement detection unit 140 is used for detecting whether the data frame 113 is dragged to the boundary 117 of the first electronic device 110. The displacement detection unit 140 is also used for detecting whether the data frame 123 is dragged to the boundary 127 of the second electronic device 120.

In addition, when the series code of the mouse 130 and the series code of the first electronic device 110 are paired and connected with each other or the series code of the mouse 130 and the series code of the second electronic device 120 are paired and connected with each other, the displacement detection unit 140 can be used for detecting coordinate positions of the cursor 115 and the data frame 113 on the display screen 111 of the first electronic device 110. The displacement detection unit 140 can also be used for detecting coordinate positions of the cursor 125 and the data frame 123 on the display screen 121 of the second electronic device 120.

In an exemplary embodiment for controlling a cursor, when the mouse 130 controls the cursor 115 of the first electronic device 110, the mouse 130 is paired and connected with the first electronic device 110. The displacement detection unit 140 detects that the cursor 115 moves from the boundary 117 of the display screen 111 in the first electronic device 110 to the boundary 127 of the display screen 121 in the second electronic device 120. The original connection between the mouse 130 and the first electronic device 110 becomes a connection between the mouse 130 and the second electronic device 120. The cursor 115 on the display screen 111 of the first electronic device 110 becomes the cursor 125 on the display screen 121 of the second electronic device 120.

In an exemplary embodiment for controlling a data frame, when the mouse 130 controls the first electronic device 110, the mouse 130 connects with the first electronic device 110, the displacement detection unit 140 detects the cursor 115 dragging the data frame 113 from the boundary 117 of the display screen 111 in the first electronic device 110 to the boundary 127 of the display screen 121 in the second electronic device 120, an original connection between the mouse 130 and the first electronic device 110 becomes a connection between the mouse 130 and the second electronic device 120. Therefore, the data frame 113 on the display screen 111 of the first electronic device 110 is copied or moved to the data frame 123 on the display screen 121 or a display interface in the second electronic device 120. More specifically, when the detection program of the first electronic device 110 detects the above-mentioned operations, the detection program outputs the first group of series codes and the second group of series codes to the cloud server 102 in the wireless network and transmits the data between the first electronic device 110 and the second electronic device 120 through the cloud server 102. That is to say, a data transmission channel of the data frame between the first electronic device 110 and the second electronic device 120 is different from a channel of a cursor transmission between the mouse 130 and the first electronic device 110 or the mouse 130 and the second electronic device 120. This transmission manner can avoid affecting the smoothness of outputting the cursor by the mouse 130, and can effectively improve a data transmission speed of the data frame between different electronic devices.

Figure 2:
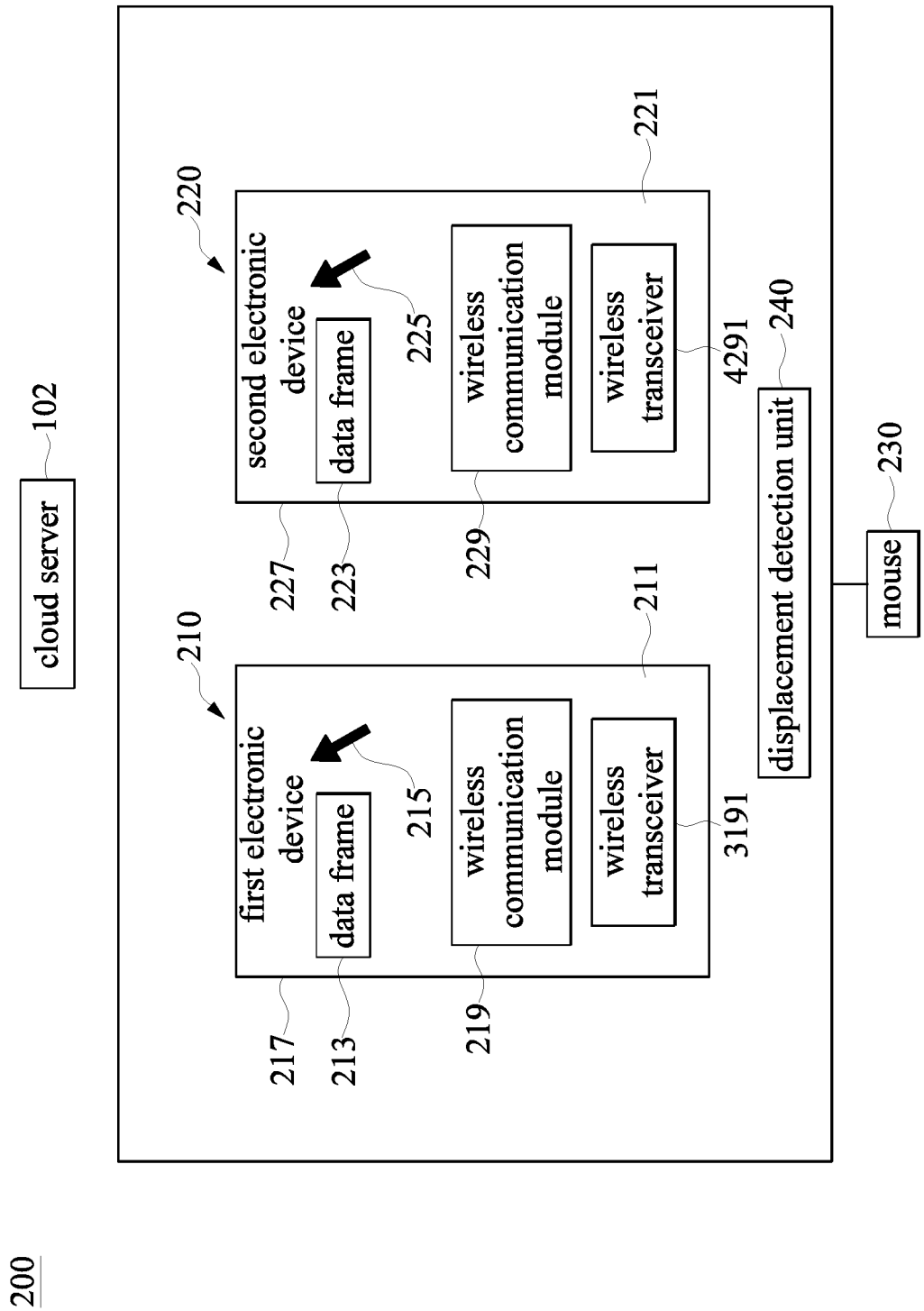
FIG. 2 is a block diagram showing a cursor control system depicted in accordance with another exemplary embodiment of the present disclosure.

Reference is made to FIG. 2. FIG. 2 is a block diagram showing a cursor control system depicted in accordance with another exemplary embodiment of the present disclosure. The cursor control system 200 includes a first electronic device 210, a second electronic device 220, a mouse 230 and a displacement detection unit 240. More specifically, in the cursor control system 200 of the exemplary embodiment related to the cursor control system 100 of FIG. 1, the first electronic device 210 further includes a wireless communication module 219 and a wireless transceiver 3191 and the second electronic device 220 further includes a wireless communication module 229 and a wireless transceiver 4291. A main operation manner of the cursor control system 200 is similar to that of the above-mentioned cursor control system 100, and will not be described herein. Next, the differences between the operation manners of the cursor control systems 100, 200 are described as follows.

In this exemplary embodiment, the first electronic device 210 and the second electronic device 220 respectively have the wireless communication module 219 and the wireless communication module 229 that provides high speed/high volume data transfer between the first electronic device 210 and the second electronic device 220, for example, a data transmission of the data frame between the electronic devices. For example, when the displacement detection unit 240 detects that the data frame 213 is dragged from the boundary 217 of the display screen 211 in the first electronic device 210 to the boundary 227 of the display screen 221 in the second electronic device 220, a data of the data frame in the first electronic device 210 is transferred by the wireless communication module 219 of the first electronic device 210 to the cloud server 102 through the wireless network, the data of the data frame is transferred by the cloud server 102 to the wireless communication module 229 of the second electronic device 220, and then the data of the data frame 213 of the first electronic device 320 is received by the second electronic device 220. The wireless communication modules 219, 229, for example, are a WIFI communication module or a mobile communication module. In another exemplary embodiment, when the wireless communication modules 219, 229 are supported by a direct data transmission technology, a data transmission of the data frames 213, 223 between the first electronic device 210 and the second electronic device 220 can be directly transmitted to each other and not be transmitted through the cloud server 102.

In addition, in this exemplary embodiment, the first electronic device 210 and the second electronic device 220 respectively have the wireless transceiver 3191 and the wireless transceiver 4291 that provides low speed/low volume data transfer between the first electronic device 210 and the second electronic device 220, for example, a data transmission of the cursor of the mouse 230. For example, the mouse 230 connects with the first electronic device 210 through the wireless transceiver 3191, that is, the first electronic device 210 can wirelessly receive the cursor 215 outputted by the mouse 230 through the wireless transceiver 3191. Similarly, the mouse 230 connects with the second electronic device 220 through the wireless transceiver 4291, that is, the second electronic device 220 can wirelessly receive the cursor 225 outputted by the mouse 230 through the wireless transceiver 4291. The wireless transceivers 3191, 4291, for example, are a Bluetooth communication module or a wireless radio frequency communication module.

It is worth mentioning that, when the cursor 215 outputted by the mouse 230 is received by the first electronic device 210 and the detection program of the first electronic device 210 detects that the cursor moves into a predetermined boundary of the display screen 211, the detection program of the first electronic device 210 outputs a switch signal to the mouse 230, so as to indicate that the mouse 230 switches the cursor 215 originally outputted to the first electronic device 210 from the first electronic device 210 to the second electronic device 220. When the mouse 230 receives the switch signal, the mouse 230 acquires that the cursor 215 should be switched to the second electronic device according to the switch signal. Therefore, the mouse 230 disconnects with the wireless transceiver 3191 or does not output the cursor to the wireless transceiver 3191, and the mouse 230 connects with the wireless transceiver 4291 and outputs the cursor to the second electronic device 220.

Figure 3:
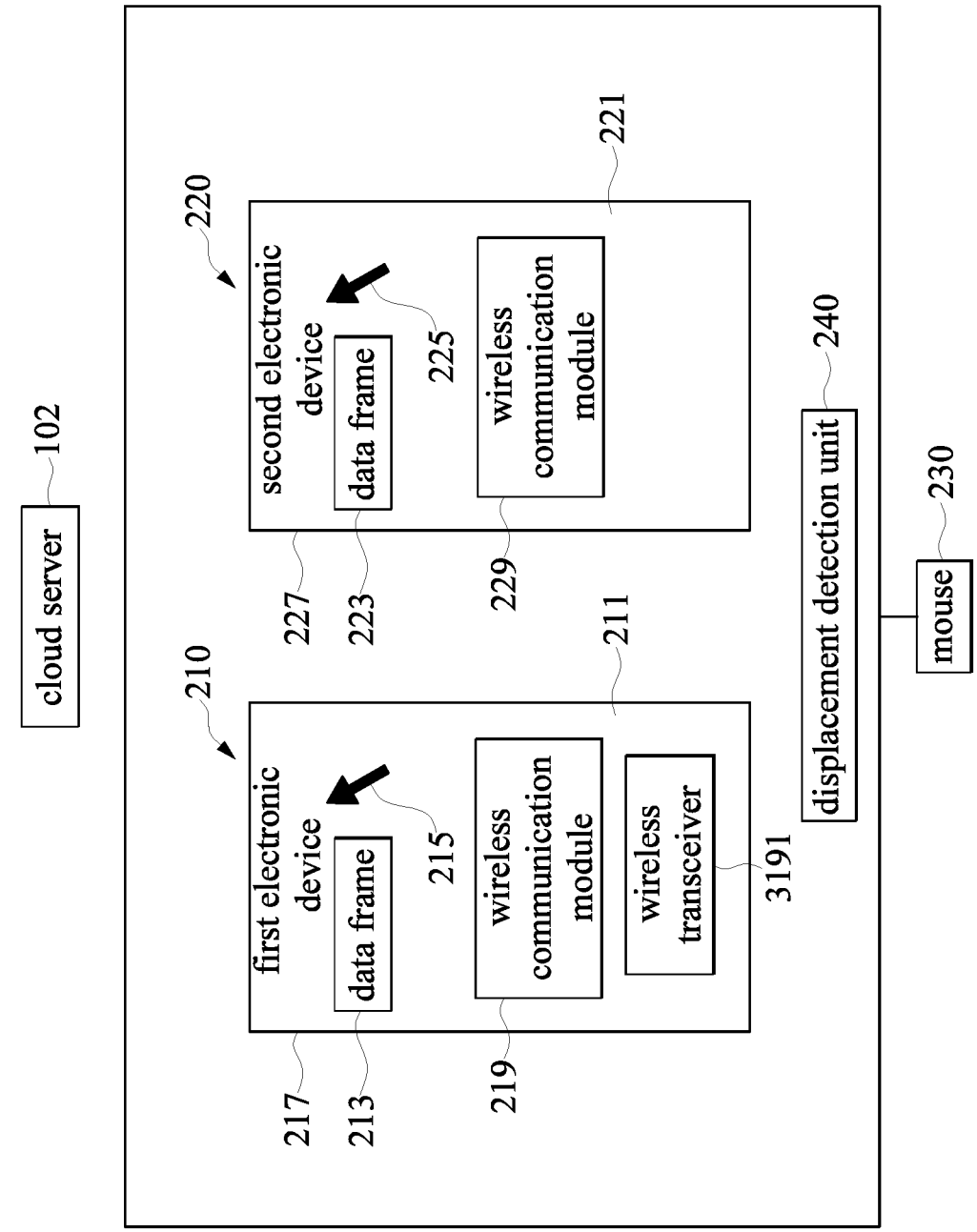
FIG. 3 is a block diagram showing a cursor control system depicted in accordance with another exemplary embodiment of the present disclosure.

Reference is made to FIG. 3. FIG. 3 is a block diagram showing a cursor control system depicted in accordance with another exemplary embodiment of the present disclosure.

The cursor control system 300 includes a first electronic device 210, a second electronic device 220, a mouse 230 and a displacement detection unit 240. More specifically, in the cursor control system 300 of the exemplary embodiment related to the cursor control system 200 of FIG. 2, the second electronic device 220 does not include the wireless transceiver 4291 illustrated in FIG. 2. A main operation manner of the cursor control system 300 is similar to that of the above-mentioned cursor control system 200, and will not be described herein. Next, differences between the two cursor control systems 200, 300 are described as follows.

The mouse 230 of FIG. 3 outputs the cursor 215 through the wireless transceiver 3191 to be received by the electronic device 210. However, the second electronic device 220 does not include the above-mentioned wireless transceiver 4291, the mouse 230 does not output directly the cursor 225 to the second electronic device 220. In this exemplary embodiment, the cursor 225 output by the mouse 230 to the second electronic device 220 is indirectly output through the first electronic device 210. For example, when the mouse 230 outputs the cursor 215 to be received by the first electronic device 210 and the detection program of the first electronic device 210 detects the cursor 215 to move into the predetermined boundary of the display screen 211, the detection program of the first electronic device 210 outputs the switch signal to the mouse 230, so as to indicate that the mouse 230 switches the cursor 215 outputted to the first electronic device 210 from the first electronic device 210 to the second electronic device 220. When the mouse 230 receives the switch signal, the mouse 230 acquires that the cursor 215 is switched to output to the second electronic device 220 according to a content of the switch signal. Therefore, the mouse 230 outputs a transfer signal to inform the first electronic device 210 to transfer the cursor to the second electronic device 220. When the detection program of the first electronic device 210 receives the transfer signal, the cursor outputted by the mouse 230 is still outputted to the first electronic device 210, but the first electronic device 210 does not display the cursor at this time. The detection program of the first electronic device 210 outputs the cursor through the wireless communication module 219 to the cloud server 102, the cloud server 102 outputs the cursor to the second electronic device 220, and then the second electronic device 220 receives and displays the cursor 225.

Figure 4:
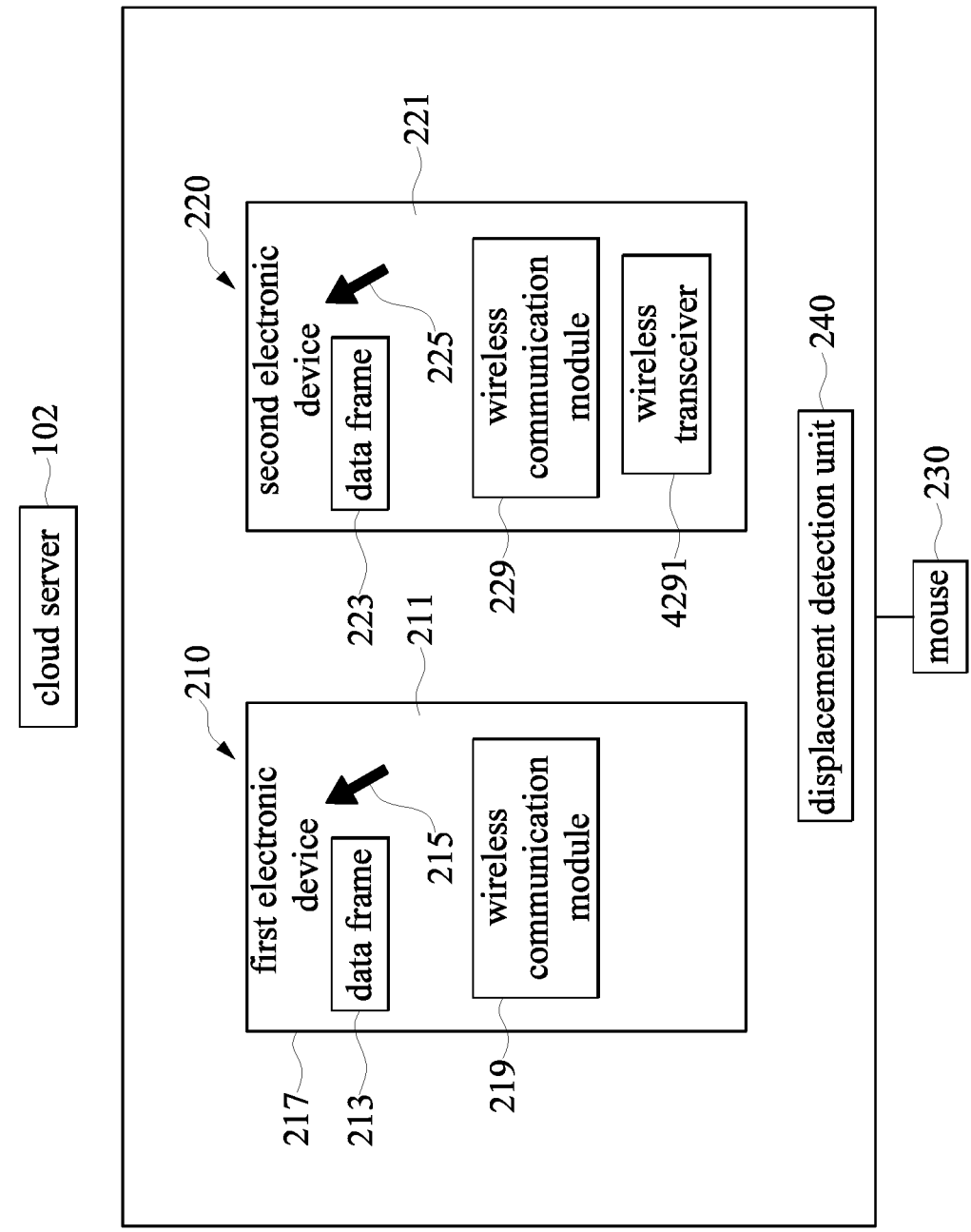
FIG. 4 is a block diagram showing a cursor control system depicted in accordance with another exemplary embodiment of the present disclosure.

Reference is made to FIG. 4. FIG. 4 is a block diagram showing a cursor control system depicted in accordance with another exemplary embodiment of the present disclosure.

The cursor control system 400 includes a first electronic device 210, a second electronic device 220, a mouse 230 and a displacement detection unit 240. More specifically, in the cursor control system 400 of the exemplary embodiment related to the cursor control system 200 of FIG. 2, the first electronic device 210 does not include the wireless transceiver 3191 illustrated in FIG. 2. A main operation manner of the cursor control system 300 is similar to that of the above-mentioned cursor control system 200, and will not be described herein. Next, differences between the cursor control systems 200, 300 are described as follows.

The mouse 230 of FIG. 4 connects to the first electronic device 210 through the wired transmission line, and the first electronic device 210 receives the cursor 215 outputted by the mouse 230 through the transmission line. In addition, the mouse 230 connects with the second electronic device 230 through the wireless transceiver 4291, that is, the second electronic device 220 wirelessly receives the cursor 225 outputted by the mouse 230 through the wireless transceiver 4291. In this exemplary embodiment, when the cursor 215 outputted by the mouse 230 is received by the first electronic device 210 through the transmission line and the detection program of the first electronic device 210 detects the cursor to move into a predetermined boundary of the display screen 211, the detection program of the first electronic device 210 outputs a switch signal to the mouse 230, so as to indicate that the mouse 230 switches the cursor 215 originally outputted to the first electronic device 210 from the first electronic device 210 to the second electronic device 220. When the mouse 230 receives the switch signal, the mouse 230 acquires that the cursor 215 should be switched to the second electronic device according to the switch signal. Therefore, the mouse 230 does not output the cursor 215 to the first electronic device 210 through the transmission line, and the mouse 230 connects with the wireless transceiver 4291 and outputs the cursor 225 to the second electronic device 220.

Figure 5:
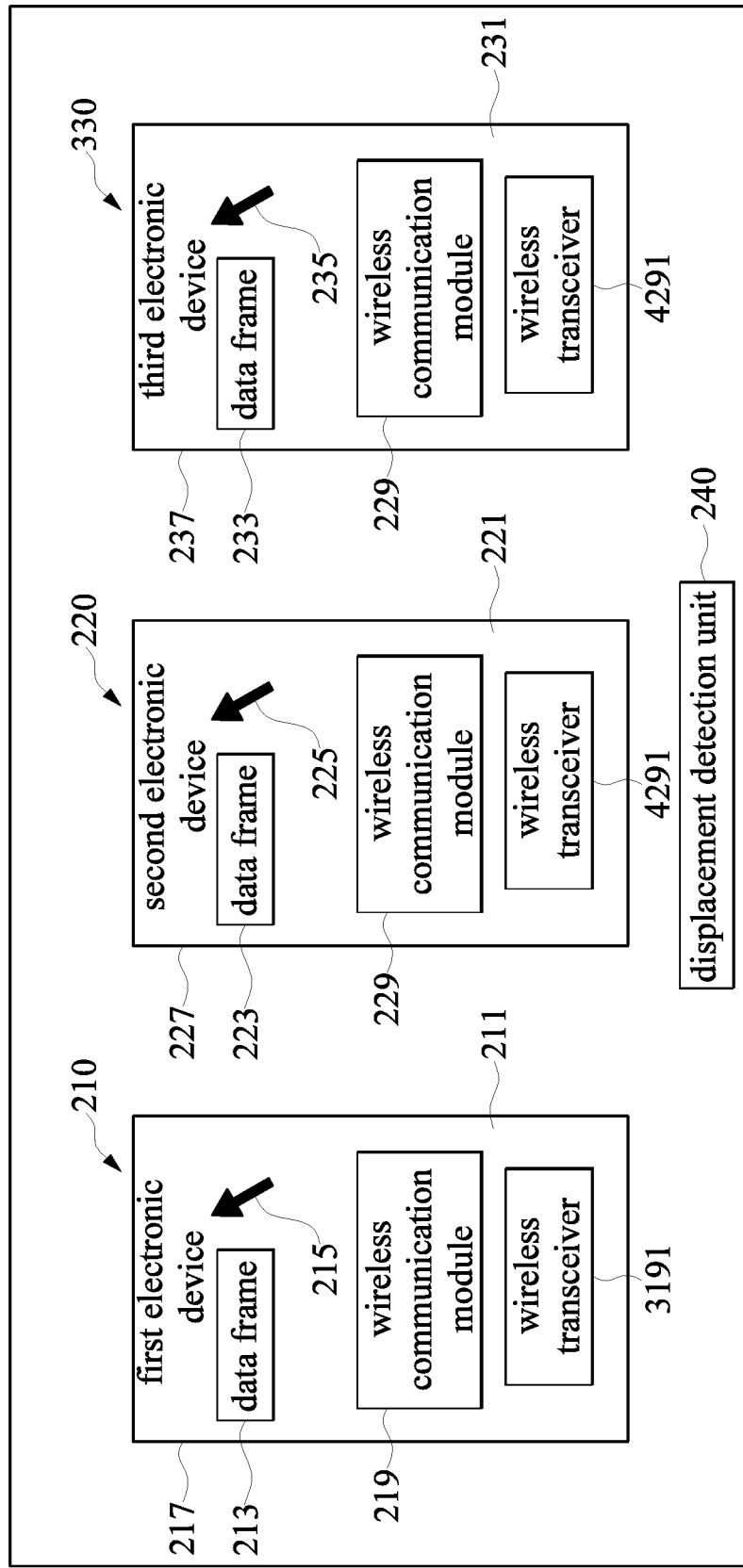
FIG. 5 is a block diagram showing a cursor control system depicted in accordance with another exemplary embodiment of the present disclosure.

Reference is made to FIG. 5. FIG. 5 is a block diagram showing a cursor control system depicted in accordance with another exemplary embodiment of the present disclosure.

The cursor control system 500 includes a first electronic device 210, a second electronic device 220, a third electronic device 330, a mouse 230 and a displacement detection unit 240. More specifically, the cursor control system 500 of the exemplary embodiment related to the cursor control system 200 of FIG. 2 further includes the third electronic device 330. The number of the electronic devices described herein are for exemplary purposes only. Operation manners of the cursor which is switched to different electronic devices or the data frame which is copied or moved between different electronic devices in the cursor control system 500 is similar to that of the above-mentioned cursor control system 200, and will not be described herein. Next, differences between the cursor control systems 200, 500 are described as follows.

After the electronic devices initially boot as shown in FIG. 5, the detection program of each of the electronic devices can communicate with each other to acquire a switch order corresponding to the cursor or the data frame moving into each of the boundaries 217, 227, 237 between the electronic devices. For example, a first predetermined boundary and a second predetermined boundary of the display screen 511 in the first electronic device 210 respectively are a right boundary and a left boundary of the display screen 511. When the cursor 215 illustrated on the first electronic device 210 moves into the right boundary of the display screen 211, the cursor 215 illustrated on the first electronic device 210 is switched to display on the second electronic device 220. When the cursor 215 displayed on the first electronic device 210 moves into the left boundary of the display screen 211, the cursor 215 displayed on the first electronic device 210 is switched to be displayed on the third electronic device 330.

A first predetermined boundary and a second predetermined boundary of the display screen 221 in the second electronic device 220 respectively are a right boundary and a left boundary of the display screen 221. When the cursor 225 displayed on the second electronic device 220 moves into the right boundary of the display screen 221, the cursor 225 displayed on the second electronic device 220 is switched to display on the third electronic device 330. When the cursor 225 displayed on the second electronic device 220 moves into the left boundary of the display screen 221, the cursor 225 illustrated on the second electronic device 220 is switched to display on the first electronic device 210.

A first predetermined boundary and a second predetermined boundary of the display screen 231 in the third electronic device 330 respectively are a right boundary and a left boundary of the display screen 231. When the cursor 235 displayed on the third electronic device 330 moves into the right boundary of the display screen 231, the cursor 235 displayed on the third electronic device 330 is switched to be displayed on the first electronic device 210. When the cursor 235 displayed on the third electronic device 330 moves into the left boundary of the display screen 231, the cursor 235 displayed on the third electronic device 330 is switched to display on the second electronic device 220. In addition, a movement order of the data frames 213, 223, 233 which are copied or moved between the electronic devices is the same as the above-mentioned switch order of the cursor, and will not be described in detail herein.

Figure 6:
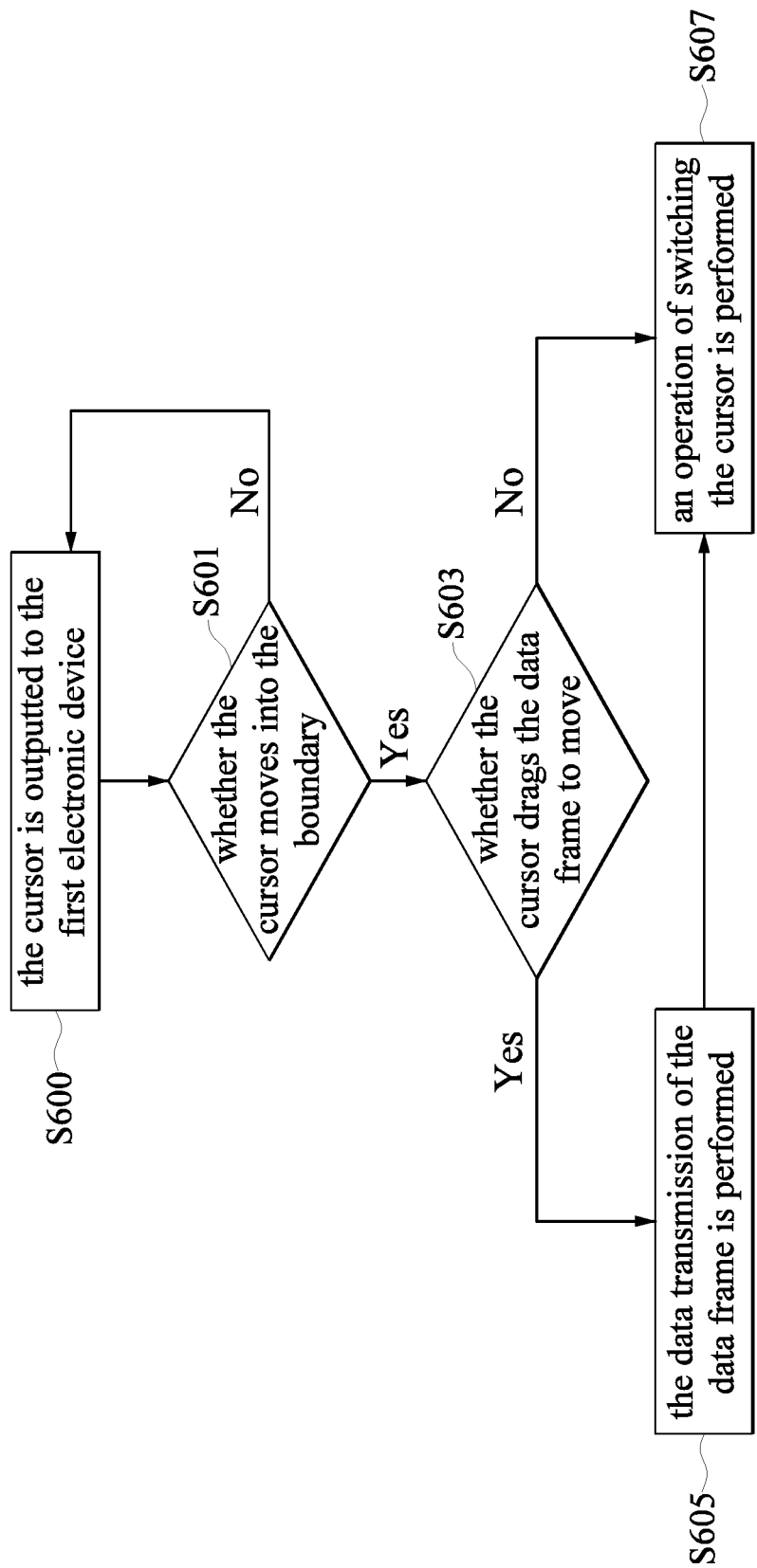
FIG. 6 is a flow chart of a cursor control method depicted in accordance with an exemplary embodiment of the present disclosure.

Reference is made to FIG. 1 and FIG. 6. FIG. 6 is a flow chart of a cursor control method depicted in accordance with an exemplary embodiment of the present disclosure. The cursor control method is applied to the cursor control system which can be, for example, one of or a combination of the above-mentioned cursor control systems, and the cursor control system of FIG. 1 is an example to describe the flow chart of FIG. 6.

In step S600, an initial presetting is that the cursor of the mouse 13 is outputted to the first electronic device.

In step S601, the displacement detection unit determines whether the cursor moves into the boundary. In this exemplary embodiment, the cursor is preset to be outputted to the first electronic device. The detection program of the first electronic device detects whether the cursor is controlled by the mouse to move into the predetermined boundary of the display screen. In step S603, if the determination in step S601 is yes, the detection program further determines whether the cursor drags the data frame to move at the same time. The detection program of the first electronic device performs the detection in this step. If the determination in step S601 is no, step S601 is continuingly performed.

In step S605, if the determination in step S603 is yes, the data transmission of the data frame is performed. In this step, when the data frame in the first electronic device is moved into the predetermined boundary, the data frame in the first electronic device is copied or moved to the second electronic device. Details in connection with the copying or moving of the data frame can be referred to in the foregoing embodiments, and will not be further described herein.

In step S607, if the determination in step S603 is no or after step S605 is executed, an operation of switching the cursor is performed. In this step, when the cursor in the first electronic device is moved to the predetermined boundary, the cursor in the first electronic device is switched to display on the second electronic device. Details in connection with switching of the cursor can be referred to in the foregoing embodiments, and will not be further described herein.

In summary, a cursor control system and a cursor control method of the present disclosure are provided. The cursor can be easily switched between multiple electronic devices through an intuitive operation of the mouse. In addition, the data frame can be dragged together with the cursor during a switch process of the cursor between different electronic devices to mutually transmit the data between multiple electronic devices. In this manner, a simple operation of multiple electronic devices and data sharing can be achieved through a mouse, so as to fully utilize and share hardware resources.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A cursor control system, comprising:
   a first electronic device;
   a second electronic device;
   a mouse outputting a cursor to be displayed on the first electronic device or the second electronic device;
   a displacement detection unit, respectively configuring a corresponding detection program in the first electronic device or the second electronic device, the detection program being used for detecting a movement of the cursor on a display screen of the first electronic device or on a display screen of the second electronic device;
   wherein when the mouse outputs the cursor on the first electronic device and the detection program of the first electronic device detects that the cursor moves into a predetermined boundary of the display screen on the first electronic device, the detection program of the first electronic device instructs the cursor outputted by the mouse to switch from the first electronic device to the second electronic device;
   wherein when the detection program of the first electronic device detects that the cursor moves into the predetermined boundary of the display screen while dragging a data frame in the display screen of the first electronic device, the detection program of the first electronic device outputs a data of the data frame in the first electronic device to a cloud server in a wireless network, and the cloud server outputs the data to the second electronic device.

2. The cursor control system according to claim 1, wherein the first electronic device and the second electronic device respectively receive the cursor outputted by the mouse through a wireless transceiver, and the cursor is switched from the first electronic device to the second electronic device by the mouse stopping outputting of the cursor to the wireless transceiver connected to the first electronic device, and outputting the cursor to the wireless transceiver connected to the second electronic device.

3. The cursor control system according to claim 1, wherein the mouse connects to the first electronic device by a transmission line and outputs the cursor to the first electronic device, the second electronic device receives the cursor outputted by the mouse through a wireless transceiver, and the cursor is switched from the first electronic device to the second electronic device by the mouse stopping outputting of the cursor to the first electronic device through the transmission line, and outputting the cursor to the wireless transceiver connected to the second electronic device.

4. The cursor control system according to claim 1, wherein when the cursor outputted by the mouse is switched from the first electronic device to the second electronic device, the detection program of the first electronic device outputs the cursor outputted by the mouse to the cloud server in the wireless network, and the cloud server outputs the cursor to the second electronic device.

5. The cursor control system according to claim 1, wherein the detection program of the first electronic device outputs a first group of identification codes and a second group of identification codes to the cloud server, so that the cloud server receives the data of the data frame from the first electronic device according to the first group of identification codes and outputs the data of the data frame to the second electronic device according to the second group of identification codes, wherein the first group of identification codes includes a series code of the mouse and a series code of the first electronic device, and the second group of identification code includes the series code of the mouse and a series code of the second electronic device.

6. A cursor control method, applied to a cursor control system including a first electronic device, a second electronic device and a mouse, the first electronic device and the second electronic device respectively having a display screen to display a data frame and a cursor, the method comprising:

when the mouse outputs the cursor on the first electronic device and a detection program of the first electronic device detects that the cursor moves into a predetermined boundary of the display screen on the first electronic device, the detection program of the first electronic device instructing the cursor outputted by the mouse to switch from the first electronic device to the second electronic device;

the mouse stopping outputting of the cursor to the first electronic device; and the mouse outputting the cursor to the second electronic device;

wherein when the detection program of the first electronic device detects that the cursor moves into the predetermined boundary of the display screen while dragging the data frame in the display screen of the first electronic device, the detection program of the first electronic device outputs a data of the data frame in the first electronic device to a cloud server in a wireless network, and the cloud server outputs the data to the second electronic device.

7. The cursor control method according to claim 6, wherein when the cursor outputted by the mouse is switched from the first electronic device to the second electronic device, the detection program of the first electronic device outputs the cursor outputted by the mouse to the cloud server in the wireless network, and the cloud server outputs the cursor to the second electronic device.

8. The cursor control method according to claim 6, wherein the detection program of the first electronic device outputs a first group of identification codes and a second group of identification codes to the cloud server, so that the cloud server receives the data of the data frame from the first electronic device according to the first group of identification codes and outputs the data of the data frame to the second electronic device according to the second group of identification codes, wherein the first group of identification codes includes a series code of the mouse and a series code of the first electronic device, the second group of identification code includes the series code of the mouse and a series code of the second electronic device.

* * * * *